June 22, 1965 A. M. LIPPISCH 3,190,582
GROUND EFFECTS UTILIZING AND TRANSITION AIRCRAFT
Filed Jan. 2, 1964 2 Sheets-Sheet 1
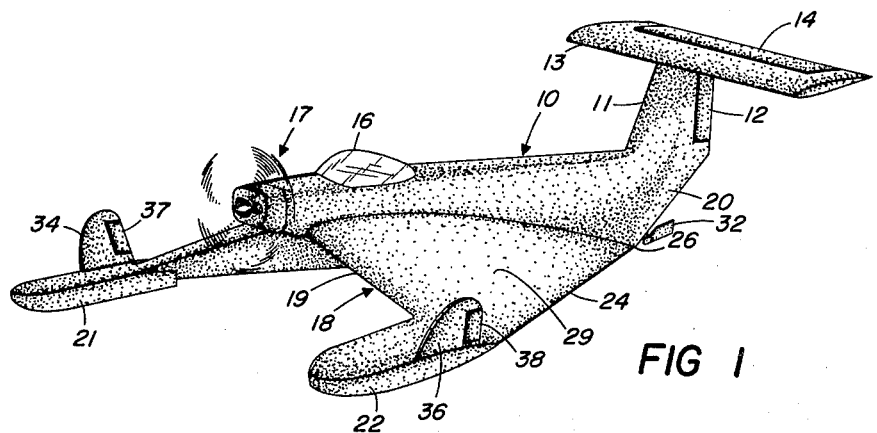
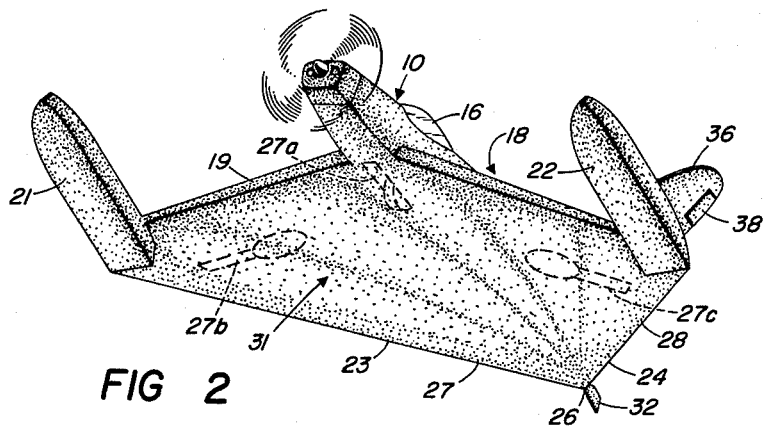
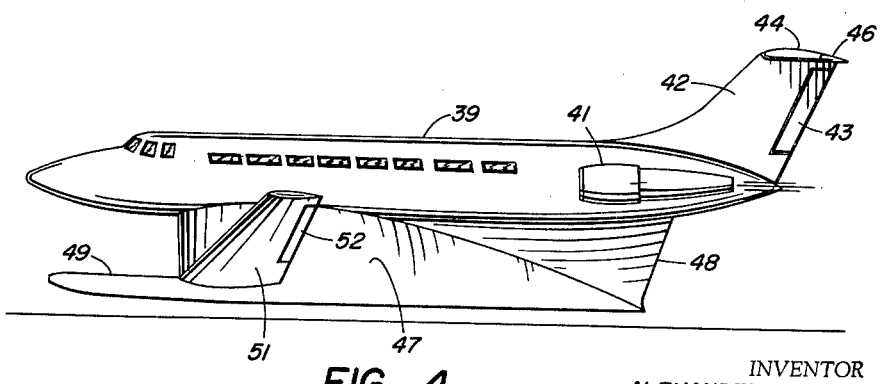
INVENTOR
ALEXANDER M. LIPPISCH
BY
ATTORNEY June 22, 1965  A. M. LIPPISCH  3,190,582
GROUND EFFECTS UTILIZING AND TRANSITION AIRCRAFT
Filed Jan. 2, 1964  2 Sheets-Sheet 2

INVENTOR
ALEXANDER M. LIPPISCH
BY
ATTORNEY

United States Patent Office 3,190,582
Patented June 22, 1965

3,190,582
GROUND EFFECTS UTILIZING AND
TRANSITION AIRCRAFT
Alexander M. Lippisch, Cedar Rapids, Iowa, assignor to Collins Radio Company, Cedar Rapids, Iowa, a corporation of Iowa
Filed Jan. 2, 1964, Ser. No. 335,211
9 Claims. (Cl. 244—12)

This invention relates in general to a combination air and water and/or land takeoff craft which, in an amphibian or seaplane version, operates as a boat at low speeds and as a transition craft at higher speeds, and at even higher speeds, at low altitude, as a ground effect flying vehicle, and at higher altitudes as a true aircraft.

The present invention consists of a craft having an airfoil with a rearward edge extending between swept forward wing tips adjacent the ends of the leading edge and with the rearward edge positioned much farther back through the center region of the wing. This rearward airfoil edge engages the water at low speeds while the leading edge is upwardly arched between the outer ends to present considerable clearance above the water through the center region of the leading edge. In this version the airfoil outer ends are terminated in pontoons in an aircraft so designed that the center of aerodynamic lift and center of hydrodynamic lift are at substantially the same location. This insures craft stability in transition from waterborne to airborne states of operation. The planing portion of the undersurface of the airfoil is designed to obtain good performance particularly with the trailing edge of the airfoil surface swept forward with lateral extension outward from the center longitudinal axis of the craft. Such a design produces in effect an aerodynamic seal adjacent the trailing edge during operation in the ground effects region to thereby produce a cushion of air exerting a higher pressure on the lower surface of the airfoil and aids in providing low induced drag for the craft. It has been known that airfoils have improved performance in ground effects in the close vicinity of ground or water.

It is an object of the present invention to provide a vehicle which operates efficiently in the water and air and is particularly designed for efficient performance in the region of ground effects.

Another object of the invention is to provide a ground effects craft which makes an efficient transition from the waterborne state to airborne operation in the ground effects area of operation, and also capable of operation as an aircraft at higher altitudes completely out of the ground effects area of operation.

A feature of this invention is found in the provision for a combination wing and planing surface with, from the center, a rear edge swept forward with outward extension to terminate, adjacent the leading edge at the outer ends, in pontoons. Further, the planing surface is part of an airfoil having an arched leading edge, and with the rear edge being substantially common to a plane surface throughout the extension of the rear edge from end to end.

Further features, objects, and advantages of this invention will become apparent from the following description and claims when read in view of the drawings in which:

FIGURE 1 is a perspective view of the craft of this invention;

FIGURE 2 is a bottom perspective view of the craft of this invention;

FIGURE 3b is a front view of the wing of FIGURE 3a;

Figure 3A:
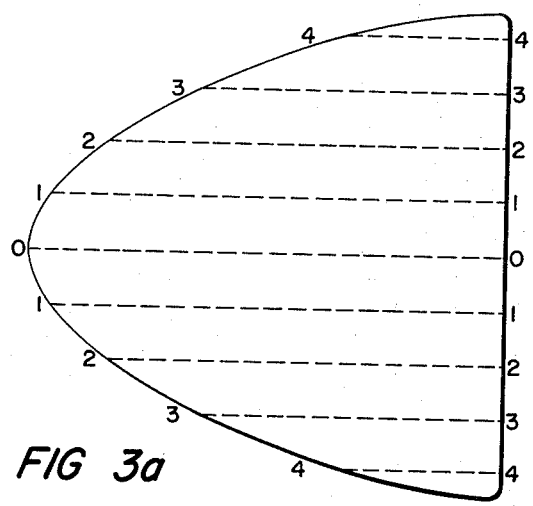
FIGURE 3a is a plan view of a basic wing shape.
Figure 3B:
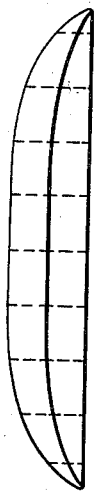
Figure 3C:
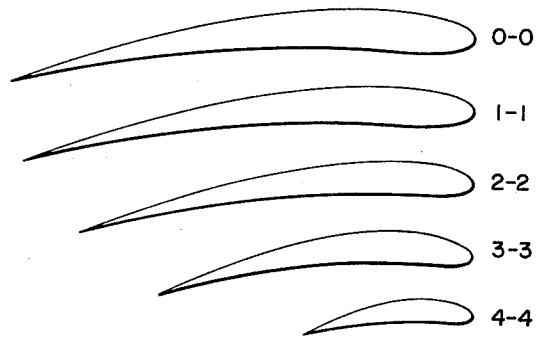
Figure 5:
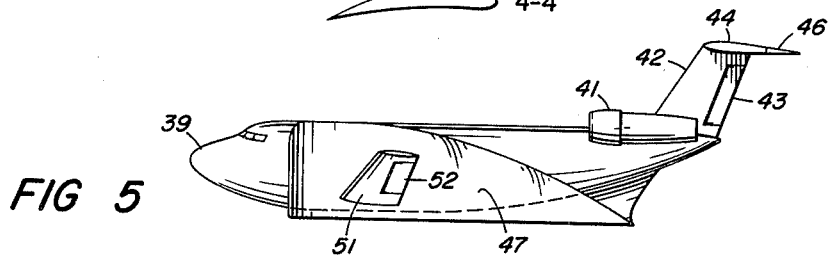
Figure 6:
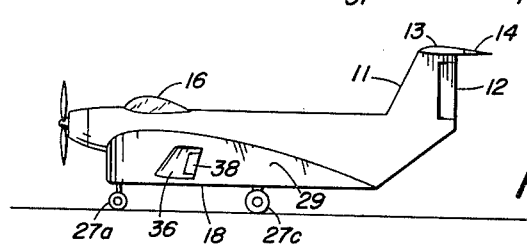

FIGURE 3c consists of cross-sectional views of the wing on lines shown in FIGURE 3a;

FIGURES 4 and 5 are side views of large passenger and/or cargo carrying craft according to this invention; and FIGURE 6 is a side view of a landing gear equipped craft with a wing of the invention.

FIGURE 1 illustrates a fuselage 10 which is provided with a vertical fin 11 in which is mounted a rudder 12. A horizontal stabilizer 13 is attached to the top of vertical fin 11 and carries an elevator 14. A cockpit 16 is provided in the forward portion of the fuselage, and a power plant 17 is mounted in the fuselage. Although the power plant illustrated has a propeller, any conventional type of power plant could be used, as for example, a jet engine.

Attached to the fuselage is a combination airfoil planing surface 18. A fairing 20 joins the rear of the fuselage and airfoil 18. The airfoil section 18 is generally triangularly shaped in planned view with the leading edge 19 of the airfoil extending downwardly and outwardly to pontoons 21 and 22. The trailing airfoil edges 23 and 24 of the craft meet at a point 26 adjacent the tail of the fuselage, are substantially common to one plane, and are the rear edges of planing surfaces when the craft is in the water. It should be noted that the craft could be made an amphibian by equipping it with landing gear such as the retractable tricycle landing gear 27a, 27b, and 27c indicated in phantom in FIGURE 2 in the retracted state.

The upper surface 29 of airfoil 18 is curved such as with a wing so as to help produce lift. The lower surface 31 of the member 18, bounded by rear trailing edges 23 and 24, with the trailing edges helping, when the craft is in the water, creates a cushion of air beneath the airfoil as the craft is moving forward. This cushion of air, particularly when the trailing edges 23 and 24 are still under water and generally when the craft is low in the ground effects area of operation, is, with vehicle forward motion, in effect, a stagnation pressure area below the vehicle separated from outer air flow by the sealing off effect to the rear and to the sides by the airfoil itself. A retractable rudder 32 is provided behind the center of the rear edge of the airfoil to provide control at low velocities when the craft is in the water. To provide roll stability, small winglets 34 and 36 are attached to the pontoons 21 and 22, respectively, and are provided with movable control surfaces 37 and 38 for vehicle roll control.

The craft is designed to set in the water relatively flat when at rest, and for the center of pressure when planing to substantially correspond to the center of lift. As the craft moves through the water at low speeds, it may be maneuvered by the rudder 32. As speed is increased, the pressure of the water and air cushion pressure built up beneath the airfoil with forward movement, causes the craft to move upwardly onto the bottom of the pontoons, and varying areas of the undersurface of airfoil 18 adjacent rear edges 23 and 24 serve as planing surfaces. This occurs without substantial shifting of the effective center of hydrodynamic upward pressure while still in planing contact with the water. Simultaneously, the upper surface 29 of the airfoil will create lift, and the air pocket formed under the airfoil 18 of the craft will produce increased pressure with increased speed to aid in lifting it. As the speed is increased, the elevator 14, rudder 12, and roll control surfaces 37 and 38, become more effective, the craft may be flown in ground effects out of engagement with the water. Since the center of lift and center of pressure of the craft substantially coincide, it is stable during the water-to-air transition. The craft operates very efficiently in the water and/or ground effects in the air and also effectively in full flight out of ground effects in the air.

FIGURE 3 illustrates an airfoil somewhat similar to the one shown in FIGURES 1 and 2. FIGURE 3a is a plan view of the surface, FIGURE 3b is a front view of the surface, and FIGURE 3c illustrates a number of sectional views taken on lines 0—0, 1—1, 2—2, 3—3, and 4—4 from FIGURE 3a.

The airfoil illustrated in FIGURE 3 has a curved rear edge substantially common to the same plane and the upper surface comprises a streamlined surface such that generally smooth air flow occurs over the surface and induced drag is minimized. The actual craft which is shown in FIGURES 1 and 2 was constructed with straight trailing edges substantially common to the same plane for simplicity of construction and flies extremely well with very low drag in ground effects. The water planing and airborne characteristics in ground effects proved to be very good as predicted by the inventors. It is believed that such craft will become common because of their efficiency, safety, speed and economy of construction and operation. Increased efficiency in ground effects through long distance operation is particularly important in increased range, reduced power requirements, and/or increased cargo carrying capacity. In this vein, it is of interest to note that some test results with such an airfoil have given a ratio of lift coefficient out of ground effects operation to the lift coefficient in ground effects, in close vicinity to the ground, in the approximate range of 1 to 4.5.

If an airfoil such as the airfoil in FIGURE 3 were held against its mirror image, it would be substantially closed throughout the side and rearward extremities with only the forward facing portion having an opening. Thus, static air pressure would build up within the enclosed pocket with forward motion of the airfoil along with its mirror image. Such an airfoil shape would lend itself very well to high performance in ground effects with flying vehicles capable of full flight, in place of a triangular wing such as used in the FIGURES 1 and 2 embodiment. The airfoil shape of FIGURE 3, or in the triangular modified form, could be used in the passenger or cargo carrying embodiments of FIGURES 4 and 5 or the embodiment of FIGURE 6, in land takeoff, seaplane, or amphibian configurations. In some of the larger embodiments the passenger and/or cargo carrying fuselage could, instead of being perched on top of the center portion of the wing, be located lower, extending through the wing or any position between upper and lower position extremes, dependent upon size and design of the particular craft involved. This may be accomplished without materially or adversely affecting the aerodynamic performance characteristics of the general airfoil wing shape having an upwardly arched leading edge and having continuous side and rear edging substantially common to the same plane. In fact, a low slung fuselage acting as a float when the craft is in water, could be an advantage in reducing or eliminating wing tip float requirements in some seaplane or amphibian versions.

In a typical commercial embodiment of the invention as shown in FIGURE 4, the fuselage 39 has rear propulsion units 41 mounted on either side of the tail, and has a vertical fin 42 on which is mounted a movable rudder 43. A horizontal stabilizer 44 has an elevator 46. The planing airfoil 47 is attached to the fuselage and has a fairing 48. Pontoons 49 are attached forwardly and outboard of the airfoil 47, and winglets 51 are attached at each pontoon and are provided with roll control surfaces 52. Such a craft is capable of carrying large loads with relatively low power and will operate very efficiently either as a boat or an aircraft in the ground effect area, or effectively in full flight at higher altitudes.

In the embodiments of FIGURES 5 and 6 various components duplicating similar components to those in the correspondingly related embodiments of FIGURE 4 and FIGURES 1 and 2 are numbered the same as a matter of convenience. It should be noted, however, that fuselage 39, for example, in the embodiment of FIGURE 5, is low in the craft relative to wing 47 and the wings are not equipped with floats 49 as in the embodiment of FIGURE 4. In the embodiment of FIGURE 6, the airfoil 18 mounts winglets 34 and 36 directly instead of their being mounted on pontoons as shown in the FIGURE 1 embodiment. With the various embodiments, it should be noted that ground effect occurs through altitudes above the surface of the water (or ground) to approximately the equivalent of one tenth the span of the wing of the respective embodiments.

A model, as shown in FIGURES 1 and 2, has been constructed and flown which weighs approximately 350 pounds, for performance with a gross weight of approximately 550 pounds, and with a takeoff speed of 40 miles per hour. The craft is equipped with approximately a 25 horsepower engine, has a projected wing area of 110 square feet, and a wing span of 14 feet. The maximum power requirement while planing is approximately 15 horsepower, while the power required for ground effect operation falls back to approximately 4 to 5 horsepower, while for free flight out of ground effects, at 60 miles per hour, the horsepower requirement rises again to approximately 18 to 20 horsepower.

Thus, it may be seen that this invention provides very efficient ground effect flying vehicles capable of effective flight as true aircraft at higher altitudes out of ground effects, and for seaplane or amphibian versions, efficient operation as a planing boat in water.

Whereas this invention is here illustrated and described with respect to several specific embodiments thereof, it should be realized that various changes may be made without departing from the essential contributions to the art are made by the teachings hereof.

I claim:

1. A craft capable of moving in the water, closely adjacent to the ground, on water, in the ground effect area, or as an aircraft, comprising generally triangular shaped airfoil means having from its center portion a downwardly extending leading edge to each end which forms one side of the triangle, and a pair of trailing edges forming the other two sides of the triangle with the trailing edges lying in substantially the same plane, said airfoil means being formed with an upper curved surface capable of producing lift as said airfoil means is moved through the air, and formed with a lower surface forming a pressure pocket capable of producing upward pressure as the craft is moved forwardly; and a pair of pontoons attached to said airfoil means at the ends of the leading edge and in the same plane as the trailing edges so as to provide planing surfaces together with said trailing edges as the craft is moved through a fluid.

2. In apparatus according to claim 1, a pair of winglets extending upwardly and outwardly from each of said pontoons, and each formed with a movable control surface to provide roll stability to the craft.

3. In apparatus according to claim 1, water rudder means attached to the craft to provide directional stability to the craft while moving in water.

4. A craft capable of moving in water, closely adjacent to the water in the ground effect area, or at higher altitudes as an aircraft, comprising generally triangular shaped airfoil means, a fuselage attached to said airfoil means, the forward edge of said airfoil means forming one side of the triangle and extending generally downwardly from the fuselage, a pair of trailing edges, said trailing edges forming the other two sides of the triangle and lying in the same plane, a pair of pontoons attached to said airfoil means at either tip of the leading edge, a winglet attached to each pontoon and extending upwardly and outwardly, movable roll stabilizing control surfaces attached to each winglet to provide roll stability, propulsion means attached to the fuselage, a vertical stabilizer attached to the fuselage and provided with a movable rudder to provide lateral stability, and a horizontal stabilizer attached to the fuselage and provided with an elevator to provide pitch stability.

5. In a craft, means defining a wing having an upper surface of substantially streamlined shape, an under surface of substantially concave shape, trailing edges lying substantially in a common plane, and a leading edge the transverse extremities of which lie substantially on said common plane, said leading edge extending substantially arcuately upwardly from said extremities, said under surface in conjunction with said common plane providing a forwardly opening pocket, said leading edge providing access to said pocket whereby when said craft is moving in a forwardly direction lifting occurs, with said wing trailing edges extending outwardly from the center portion of the wing and extending forwardly progressively with outward extension of the trailing edges; and further characterized by pontoons connected to said wing at said extremities, the under surface of said pontoons and trailing edge portions of said wing forming a planing surface when said craft is traveling on water.

6. The apparatus according to claim 5 further characterized by upwardly and outwardly flaring stabilizers to provide roll stability.

7. The apparatus according to claim 5 further characterized by downwardly projecting movable rudder means to provide directional stability when said craft is traveling on water.

8. A craft capable of moving in the water, closely adjacent to the ground, on water, in the ground effect area, or as an aircraft, comprising generally triangular shaped airfoil means having from its center portion a downwardly extending leading edge to each end which forms one side of the triangle, and a pair of trailing edges forming the other two sides of the triangle with the trailing edges lying in substantially the same plane, said airfoil means being formed with an upper curved surface capable of producing lift as said airfoil means is moved through the air, and formed with a lower surface forming a pressure pocket capable of producing upward pressure as the craft is moved forwardly; and landing gear provided on said craft enabling takeoff and landing from airfields in addition to water takeoff and landing, and water planing capability as an amphibian craft.

9. A craft capable of moving in the water, closely adjacent to the ground, on water, in the ground effect area, or as an aircraft, comprising generally triangular shaped airfoil means having from its center portion a downwardly extending leading edge to each end which forms one side of the triangle, and a pair of trailing edges forming the other two sides of the triangle with the trailing edges lying in substantially the same plane, said airfoil means being formed with an upper curved surface capable of producing lift as said airfoil means is moved through the air, and formed with a lower surface forming a pressure pocket capable of producing upward pressure as the craft is moved forwardly; and a horizontal stabilizer with a movable elevator being part of said craft.

References Cited by the Examiner

UNITED STATES PATENTS

| | | |
|---|---|---|
| 2,277,620 | 3/42 | Warner. |
| 2,364,676 | 11/44 | Warner _____ 244—15 |
| 2,364,677 | 11/44 | Warner _____ 244—15 |

FERGUS S. MIDDLETON, *Primary Examiner.*

RALPH D. BLAKESLEE, *Examiner.*